United States Patent
Reinhold et al.

(10) Patent No.: US 10,924,260 B1
(45) Date of Patent: Feb. 16, 2021

(54) SIGNAL ANALYSIS METHOD AND SIGNAL PROCESSING MODULE

(71) Applicant: Rohde & Schwarz GmbH & Co. KG, Munich (DE)

(72) Inventors: Michael Reinhold, Munich (DE); Adrian Ispas, Munich (DE); Julian Leyh, Munich (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 0 days.

(21) Appl. No.: 16/875,109

(22) Filed: May 15, 2020

(51) Int. Cl.
*H04L 7/00* (2006.01)
*H04B 1/7075* (2011.01)
*H04L 25/49* (2006.01)

(52) U.S. Cl.
CPC ......... *H04L 7/0087* (2013.01); *H04B 1/7075* (2013.01); *H04L 25/4917* (2013.01)

(58) Field of Classification Search
CPC .............................. H04L 7/027; H04L 7/0332
See application file for complete search history.

(56) References Cited

U.S. PATENT DOCUMENTS 6,603,821 B1 * 8/2003 Doi .......................... H04L 27/16
375/320

FOREIGN PATENT DOCUMENTS

KR  2014-0144489 A  12/2014

* cited by examiner

*Primary Examiner* — Kevin Kim
(74) *Attorney, Agent, or Firm* — Christensen O'Connor Johnson Kindness PLLC

(57) ABSTRACT

A signal analysis method is described. The signal analysis method includes the following steps. A first difference quantity is determined based on a first set of samples by a first polyphase filter, wherein the first set of samples includes at least two input samples. A second difference quantity is determined based on a second set of samples by a second polyphase filter, wherein the second set of samples includes at least two input samples, wherein the input samples associated with the second set of samples are time-shifted with respect to the input samples associated with the first set of samples. The first difference quantity and the second difference quantity are compared based on a predefined criterion. At least one timing parameter of the symbol sequence is determined based on the comparison of the first difference quantity and the second difference quantity. Further, a signal processing module is described.

20 Claims, 4 Drawing Sheets

| Poly-phase | value | diff. | sum |
|---|---|---|---|
| 0 | 1, 1, 0, 0 | 1 | 1 |
| 1 | 1, 5/6, 0 | 1/6; 5/6 | 1/36 + 25/36 = 0.722 |
| 2 | 1, 2/3, 0 | 1/3; 2/3 | 1/9 + 4/9 = 0.5556 |
| 3 | 1, 1/2, 0 | 1/2; 1/2 | 1/4 + 1/4 = 0.5 |
| 4 | 1, 1/3, 0 | 2/3; 1/3 | 4/9 + 1/9 = 0.5556 |
| 5 | 1, 1/6, 0 | 5/6; 1/6 | 25/36 + 1/36 = 0.722 |

US 10,924,260 B1

SIGNAL ANALYSIS METHOD AND SIGNAL PROCESSING MODULE

FIELD OF THE DISCLOSURE

Embodiments of the present disclosure generally relate to a signal analysis method. Embodiments of the present disclosure further relate to a signal processing module.

BACKGROUND

Several serial transmission protocols, for example transmission protocols for high data rates, do not have a dedicated clock signal so that a clock data recovery (CDR) based on the data signal is required.

In the state of the art, clock data recovery is done by a phase-locked loop (PLL) based clock data recovery. Typically, analog components are used in order to avoid major delays in the feedbacks done by the PLL based clock recovery which might have an impact on the function and stability of the respective system used for clock data recovery.

In addition, digital solutions for clock data recovery are known in the state of the art.

For instance, phase interpolation techniques are used wherein the phase or rather the phase position of the clock signal is corrected in a feedback-controlled manner. The phase information of the data signal as well as the one of the clock signal are compared and used for controlling a phase interpolation. Thus, the respective information gathered is used for reconstructing the clock signal. The phase interpolation techniques ensure to track frequency shifts, for instance frequency shifts that occur in spread spectrum clocking (SSC) modulations. However, the technique is critical with regard to latency due to the feedback.

Another concept is based on sampling the data signal with a high sampling rate in an uncontrolled manner, also called blind oversampling. Edges in the data signal are detected which are used for determining the sampling times for generating the clock signal and recovering the respective data. Hence, no feedback is necessary. However, larger frequency shifts are critical that may occur due to spread-spectrum clocking modulations.

Accordingly, there is a need for a possibility enabling processing for N-ary serial signals, e.g. PAM-N signals, at high data rates with a large area of application.

SUMMARY

Embodiments of the present disclosure provide a signal analysis method. In an embodiment, the signal analysis method comprises the following steps:

at least one of generating input samples associated with an input signal and receiving input samples associated with an input signal, the input signal comprising a symbol sequence;

determining a first difference quantity based on a first set of samples by a first polyphase filter, the first set of samples comprising at least two of the input samples;

determining a second difference quantity based on a second set of samples by a second polyphase filter, the second set of samples comprising at least two of the input samples, wherein the input samples associated with the second set of samples are time-shifted with respect to the input samples associated with the first set of samples;

comparing the first difference quantity and the second difference quantity based on a predefined criterion; and determining at least one timing parameter of the symbol sequence based on the comparison of the first difference quantity and the second difference quantity.

The signal analysis method according to the disclosure is based on the idea to apply the polyphase filters directly to the input samples, i.e. before symbol transitions in the input signal are detected. Instead, the at least one timing parameter is determined directly based on the input samples by at least two polyphase filters, i.e. by at least the first polyphase filter and the second polyphase filter.

In some embodiments, the input samples are processed in parallel by the polyphase filters such that the first set of samples and the second set of samples are processed simultaneously.

With the signal analysis methods according to the present disclosure, no feedback loop is required in order to determine the at least one timing parameter, as the input signal or rather the input samples associated with the input signal are processed in parallel by the polyphase filters.

Thus, the signal analysis methods according to the present disclosure enables real-time processing of the input signal with small latency even at high data rates. In some embodiments, the signal analysis method according to the present disclosure enables real-time processing of the N-ary input signals with small latency.

In general, the at least one timing parameter is associated with characteristic times in the symbol sequence and/or with characteristic times in a clock signal underlying the symbol sequence. For example, the at least one timing parameter may be clock signal times of the clock signal underlying the symbol sequence, signal edge times and/or symbol times.

Therein and in the following, the term "symbol time" is understood to denote the temporal mid of the respective symbol. In other words, the symbol time is located in the middle of an eye in an eye diagram of the input signal.

The at least one determined timing parameter may then be used for decoding the input signal and/or for recovering a clock signal underlying the input signal.

According to an aspect of the present disclosure, at least a third polyphase filter is provided, wherein a third difference quantity is determined based on a third set of samples by the third polyphase filter, wherein the third set of samples comprises at least two of the input samples, and wherein the input samples associated with the third set of samples are time-shifted with respect to each of the input samples associated with the first set of samples and with respect to the input samples associated with the second set of samples. Thus, the input samples are processed simultaneously by the three polyphase filters, such that an even higher parallelism is achieved. Thus, the latency is reduced even further.

In general, a total number of P polyphase filters may be provided, wherein P is an integer bigger or equal to 2. Each set of samples associated with one of the polyphase filters is time-shifted with respect to all other sets of samples.

For example, the number P may lie between 3 and 30, for example between 5 and 25, for instance between 10 and 16.

According to another aspect of the present disclosure, the difference quantities respectively comprise at least one squared amplitude difference between two consecutive input samples associated with the respective set of samples. In other words, amplitudes of the two consecutive samples are subtracted from each other, and the difference is squared. Thus, the difference quantities respectively constitute a measure for the change of amplitude between the two consecutive samples within the respective set of samples.

In some embodiments, the predefined criterion comprises a maximum sum of squares or a minimum sum of squares.

Thus, the squared amplitude differences obtained within each set are summed, such that a sum of squared amplitude differences is obtained for each of the sets of samples.

It turned out that the set of samples that is associated with the maximum sum of squares is associated with a middle portion of the symbols of the symbol sequence. In other words, the individual input samples of that particular set of samples are assigned to the middle of an eye diagram of the input signal. Thus, by comparing the different sets of samples based on that predefined criterion, i.e. the maximum sum of squares, the symbol time is determined (the symbol time is equal to the time of the center of the eye diagram). In other words, the at least one timing parameter comprises the symbol times.

The set of samples that is associated with the minimum sum of squares is associated with a symbol transition time of the symbols of the symbol sequence. In other words, the individual input samples of that particular set of samples are located at a signal edge of the input signal. Thus, by comparing the different sets of samples based on that predefined criterion, i.e. the minimum sum of squares, the signal edge times are determined. In other words, the at least one timing parameter comprises the signal edge times.

It turned out that the minimum sum of squares criterion reliably provides the correct signal edge times even if the input signal bears imperfections, such as undershoots and/or overshoots in the area of the symbol transitions.

In a further embodiment of the present disclosure, the difference quantities respectively comprise at least one squared amplitude difference between at least one of the input samples associated with the respective set of samples and at least one amplitude threshold. In other words, amplitudes of each of the input samples are subtracted from the at least one amplitude threshold, respectively, and the difference is squared. The amplitude threshold may be a reference level for an N-ary signal, i.e. one of the possible signal levels of the N-ary signal. Thus, the difference quantities are a measure for a distance of the respective input sample to one of the possible signal levels, for example the distance to the nearest signal level.

In some embodiments, the predefined criterion comprises a minimum sum of squares. Thus, the squared amplitude differences with respect to the at least one amplitude threshold obtained within each set are summed, such that a sum of squared amplitude differences is obtained for each of the sets of samples.

It turned out that the set of samples that is associated with the minimum sum of squares is associated with a middle portion of the symbols of the symbol sequence. In other words, the individual input samples of that particular set of samples are assigned to the middle of an eye diagram of the input signal. Thus, by comparing the different sets of samples based on that predefined criterion, i.e. the minimum sum of squares, the symbol time is determined (the symbol time is equal to the time at the center of the eye diagram). In other words, the at least one timing parameter comprises the symbol times.

In another embodiment of the present disclosure, at least one of the input samples associated with the first set of samples are spaced from each other by one symbol period in time domain, and the input samples associated with the second set of samples are spaced from each other by one symbol period in time domain. In other words, the input samples within each set of samples are spaced from each other by one symbol period.

The symbol period may be known. For example the symbol period or rather the symbol rate may be input by a user. Alternatively or additionally, the symbol period may be estimated based on the input samples.

According to another aspect of the present disclosure, the sets of samples are time-shifted with respect to one another such that the input samples associated with the sets of samples are evenly distributed over at least one symbol period. Thus, the distance between sample points of neighboring polyphase filters is the symbol period divided by the number P of polyphase filters.

Accordingly, the sample rate of the input signal may be equal to or bigger than P times the sample rate of the polyphase filters.

In a further embodiment of the present disclosure, at least one of the first polyphase filter and the second polyphase filter comprises a moving average filter. In some embodiments, each of the polyphase filters comprises a moving average filter. The moving average filters may be established identically to one another except for the time shift of the respectively associated set of samples.

For example, the moving average filters may each have a length of 5 to 100 samples, for example 20 to 80 samples, for instance 35 to 65 samples. In a particular example, the moving average filters each have a length of 49 samples.

According to another aspect of the present disclosure, the first polyphase filter and the second polyphase filter are implemented in parallel. Thus, all sets of samples that are associated with the individual polyphase filters are processed simultaneously. Thus, the input signal or rather the input samples associated with the input signal are processed in a highly parallel fashion, such that the latency is reduced. For instance, the input signal may be processed in real time.

In a particular embodiment of the present disclosure, the first polyphase filter and the second polyphase filter are implemented in hardware. Hardware implemented filters bear a significantly lower latency than corresponding filters that are implemented in software. Thus, the latency is reduced even further.

In some embodiments, the polyphase filters are implemented in a field programmable gate array (FPGA). Thus, parameters of the polyphase filters such as the length of the polyphase filters can be adapted to a particular application by reprogramming the FPGA, if necessary.

In some embodiments, the at least one timing parameter comprises at least one of clock signal times, signal edge times, and symbol times. The clock signal times correspond to times of level transitions of a clock signal underlying the symbol sequence. The signal edge times correspond to times of symbol transitions of the symbol sequence, i.e. to times of level transitions of the input signal. The symbol times correspond to symbol detection times, which are usually located at the center of the respective symbols. In other words, the symbol times each correspond to the middle of an eye in an eye diagram of the input signal.

The input signal may be PAM-N coded. If the input signal is PAM-2 coded, the individual symbols are bits, i.e. the individual symbols can have either the state '0' or the state '1'. For N-ary signals, e.g. PAM-4, each symbol can have one of N different symbol values, e.g. four.

Embodiments of the present disclosure further provide a signal processing circuit or module, comprising an input circuit or module, a first polyphase filter, a second polyphase filter, and a signal analysis circuit or module. The input module is configured to at least one of generate input samples associated with an input signal and receive input samples associated with an input signal, the input signal comprising a symbol sequence. The first polyphase filter is configured to determine a first difference quantity based on a first set of samples, the first set of samples comprising at least two of the input samples. The second polyphase filter is configured to determine a second difference quantity based on a second set of samples, the second set of samples comprising at least two of the input samples, wherein the input samples associated with the second set of samples are time-shifted with respect to the input samples associated with the first set of samples. The signal analysis module is configured to compare the first difference quantity and the second difference quantity based on a predefined criterion. The signal analysis module is configured to determine at least one timing parameter of the symbol sequence based on the comparison of the first difference quantity and the second difference quantity.

In some embodiments, the signal processing module is configured to perform the signal analysis method described above.

Thus, the signal analysis module may be configured to determine the clock signal times, the signal edge times and/or the symbol times associated with the input signal.

Regarding the further properties and advantages of the signal processing module, reference is made to the explanations given above with respect to the signal analysis method, which also hold for the signal processing module and vice versa.

The signal processing module may further comprise at least a third polyphase filter, wherein the third polyphase filter is configured to determine a third difference quantity based on a third set of samples, wherein the third set of samples comprises at least two of the input samples, and wherein the input samples associated with the third set of samples are time-shifted with respect to each of the input samples associated with the first set of samples and with respect to the input samples associated with the second set of samples. Thus, the input samples are processed simultaneously by the three polyphase filters, such that an higher parallelism is achieved, thereby reducing the latency of the signal processing module.

In general, a total number of P polyphase filters may be provided, wherein P is an integer bigger or equal to 2. Each set of samples associated with one of the polyphase filters is time-shifted with respect to all other sets of samples.

For example, the number P may lie between 3 and 30, for example between 5 and 25, for instance between 10 and 16.

According to an aspect of the present disclosure, at least one of the first polyphase filter and the second polyphase filter comprises a moving average filter. The moving average filters may be established identically to one another except for the time shift of the respectively associated set of samples.

For example, the moving average filters may each have a length of 5 to 100 samples, for example 20 to 80 samples, for instance 35 to 65 samples. In a particular example, the moving average filters each have a length of 49 samples.

According to another aspect of the present disclosure, the first polyphase filter and the second polyphase filter are implemented in parallel. Thus, all sets of samples that are associated with the individual polyphase filters are processed simultaneously. Thus, the input signal or rather the input samples associated with the input signal are processed in a highly parallel fashion, such that the latency of the signal processing module is reduced. In some embodiments, the input signal may be processed in real time by the signal processing module.

In a further embodiment of the present disclosure, the first polyphase filter and the second polyphase filter are implemented in hardware, such as discrete circuits, FPGAs, ASICs, integrated circuits, etc. Hardware implemented filters bear a significantly lower latency than corresponding filters that are implemented in software. Thus, the latency of the signal processing module is reduced even further.

In some embodiments, the difference quantities respectively comprise at least one squared amplitude difference between two consecutive input samples associated with the respective set of samples. In other words, amplitudes of the two consecutive samples are subtracted from each other, and the respective difference obtained is squared. Thus, the difference quantities are a measure for the change of amplitude between the two consecutive samples within the respective set of samples.

According to another aspect of the present disclosure, the predefined criterion comprises a maximum sum of squares or a minimum sum of squares. Thus, the squared amplitude differences obtained within each set are summed, such that a sum of squared amplitude differences is obtained for each of the sets of samples.

It turned out that the set of samples that is associated with the maximum sum of squares is associated with a middle portion of the symbols of the symbol sequence. In other words, the individual input samples of that particular set of samples are assigned to the middle of an eye of an eye diagram of the input signal. Thus, by comparing the different sets of samples based on that predefined criterion, i.e. the maximum sum of squares, the symbol time is determined (the symbol time is equal to the time at the center of the eye diagram). In other words, the at least one timing parameter comprises the symbol times.

Moreover, the set of samples that is associated with the minimum sum of squares is associated with a symbol transition time of the symbols of the symbol sequence. In other words, the individual input samples of that particular set of samples are located at a signal edge of the input signal. Thus, by comparing the different sets of samples based on that predefined criterion, i.e. the minimum sum of squares, the signal edge times are determined. In other words, the at least one timing parameter comprises the signal edge times.

It turned out that the maximum sum of squares criterion reliably provides the correct signal edge times even if the input signal bears imperfections, such as undershoots and/or overshoots in the area of the symbol transitions.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

Figure 1:
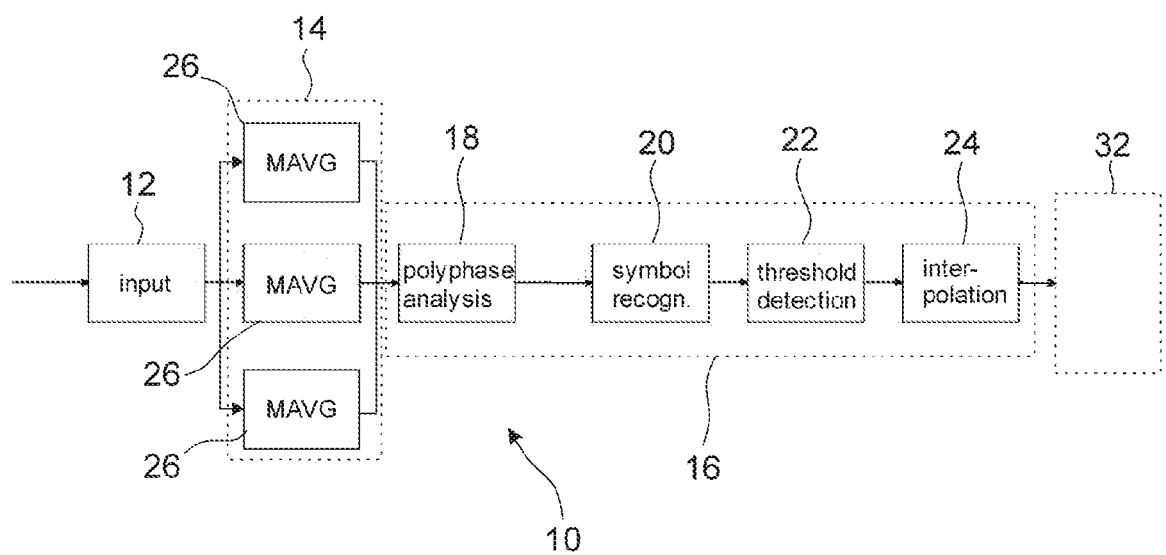
FIG. 1 shows a block diagram of a signal processing circuit or module according to an embodiment of the disclosure.

FIG. 1 schematically shows a signal processing circuit or module 10 comprising an input 12, a filter circuit or module 14, and a signal analysis circuit or module 16. The filter module 14 is provided between the input 12 and the signal analysis module 16.

Generally speaking, the signal processing module 10 is configured to receive an electric input signal via the input 12, wherein the input signal comprises a symbol sequence. The signal processing module 10 processes the input signal and determines at least one timing parameter of the input signal, wherein the at least one timing parameter comprises clock signal times, signal edge times, and/or symbol times.

The input signal may be PAM-N coded. If the input signal is PAM-2 coded, the individual symbols are bits, i.e. the individual symbols can have either the state '0' or the state '1'. For N-ary signals, e.g. PAM-4, each symbol can have one of N different symbol values, e.g. four.

Therein and in the following, the term "clock signal times" corresponds to times of level transitions of a clock signal underlying the symbol sequence or rather the input signal. The term "signal edge times" corresponds to times of symbol transitions of the symbol sequence, i.e. to times of level transitions of the input signal. The term "symbol times" corresponds to symbol detection times, which are usually located at the center of the respective symbols. In other words, the symbol times correspond to the middle of an eye in an eye diagram of the input signal.

The signal analysis module 16 comprises a polyphase analysis circuit or module 18, a symbol recognition circuit or module 20, a threshold detection circuit or module 22, and an interpolation circuit or module 24.

The filter module 14 comprises several polyphase filters 26 that are arranged in parallel. More precisely, the filter module 14 comprises a total number of P polyphase filters 26, wherein P is an integer bigger or equal to 2.

It is noted that the case P=3 shown in FIG. 1 is only one particular example chosen for illustration purposes. Of course, the filter module 14 may comprise any other number of polyphase filters 26. For example, the number P may lie between 3 and 30, for example between 5 and 25, for instance between 10 and 16.

The filter module 14 is established as a hardware filter module. Thus, the polyphase filters 26 are implemented in hardware. In some embodiments, the polyphase filters are implemented in a field programmable gate array (FPGA).

Each of the polyphase filters 26 is established as a moving average filter (MAVG) having a predefined filter length. For example, the moving average filters may respectively have a length of 5 to 100 samples, for example 20 to 80 samples, for instance 35 to 65 samples. The length may be 49 samples.

As already indicated above, each of the polyphase filters 26 is connected to both the input 12 and to the polyphase analysis module 18, wherein the filter module 14 is provided downstream of the input 12 and upstream of the polyphase analysis module 18.

Figure 2:
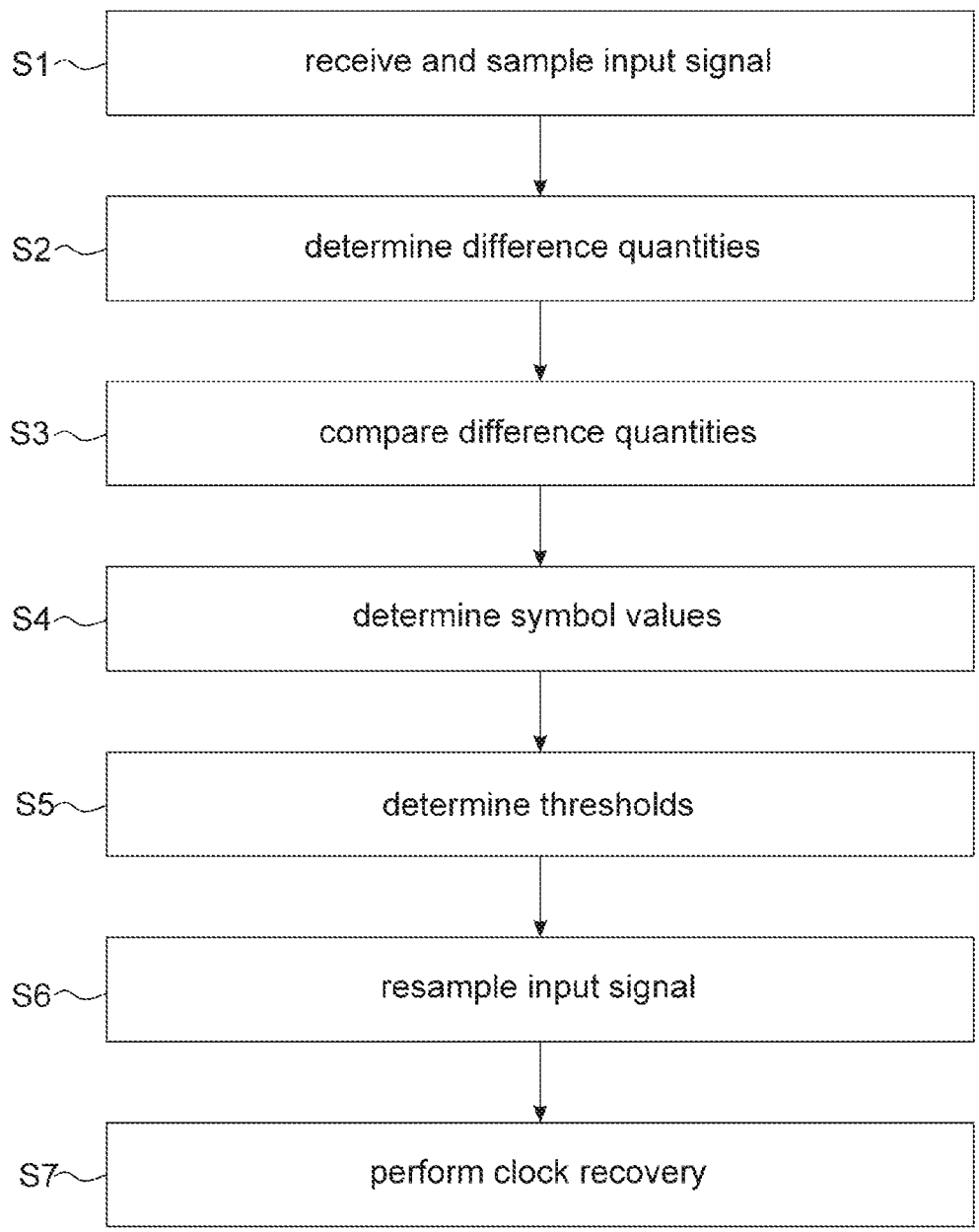
FIG. 2 shows a flow chart of a signal analysis method according to an embodiment of the disclosure.

The signal processing module 10 is configured to perform a signal analysis method described in the following with reference to FIG. 2.

The electric input signal is received and sampled by the input 12, thereby generating input samples associated with the input signal (step S1). Accordingly, the input 12 may comprise an analog-to-digital converter that is configured to digitize the (analog) input signal. Alternatively, input samples associated with the input signal may be received via the input 12. The input samples are forwarded to the filter module 14, more precisely to each of the polyphase filters 26.

Each of the polyphase filters 26 processes a particular sub-set of the samples (referred to as "set of samples" in the following) associated with the input signal and determines a difference quantity based on that particular set of samples (step S2). It is noted that the individual sets of samples can also be referred to as "polyphases" of the input signal.

Figure 3:
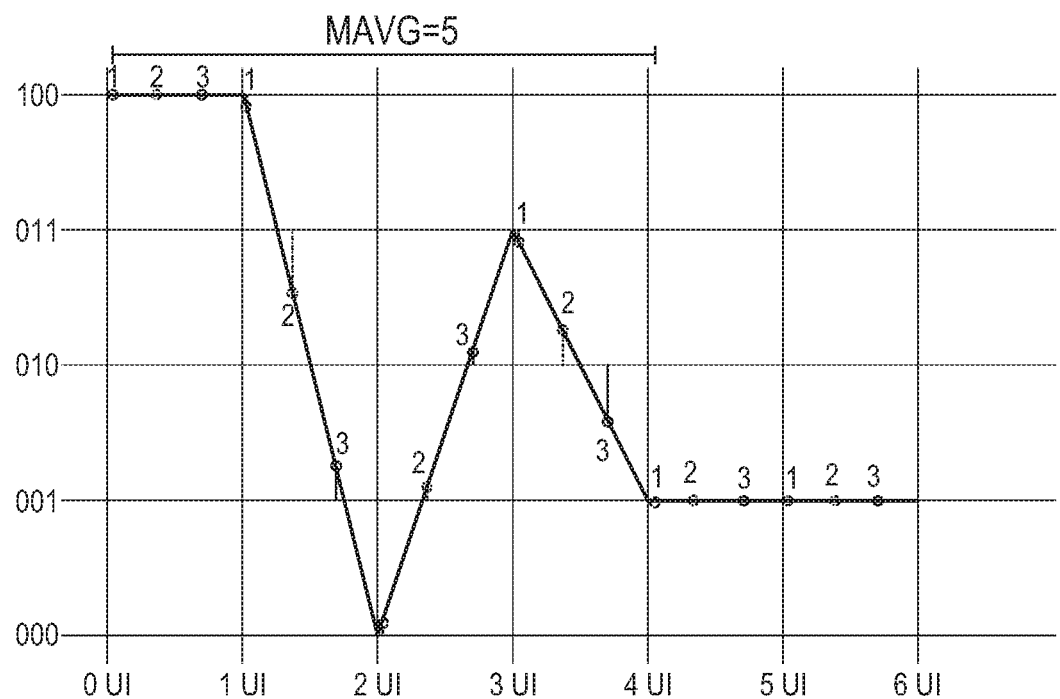
FIG. 3 shows a diagram of an input signal plotted against time.

This is illustrated in FIG. 3, which shows a plot of the input samples against time. Note that in the example shown in FIG. 3, the input signal is PAM 5 coded, such that there are five different signal levels, namely "000", "001", "010", "011", and "100".

The time axis is plotted in terms of unit intervals "UI", wherein one unit interval is equal to the symbol period of the symbol sequence. In other words, each symbol in the symbol sequence has the duration 1 UI.

In the example shown in FIG. 3, there are three sets of samples that are processed by three different polyphase filters 26, wherein a first set of samples is marked with "1", a second set of samples is marked with "2" and a third set of samples is marked with "3".

Thus, all samples in FIG. 3 that are marked with "1" are associated with the first set of samples that is processed by a first one of the polyphase filters 26. All samples marked with "2" are associated with the second set of samples that is processed by a second one of the polyphase filters 26, wherein the second one of the polyphase filters 26 is different from the first one of the polyphase filters 26. All samples marked with "3" are associated with the third set of samples that is processed by a third one of the polyphase filters 26, wherein the third one of the polyphase filters 26 is different from the first one of the polyphase filters 26 and different from the second one of the polyphase filters 26.

As can be seen in FIG. 3, the samples associated with different sets of samples are time shifted with respect to each other. More precisely, the different sets of samples are time-shifted with respect to each other such that the input samples associated with different sets of samples are evenly distributed over every symbol period, i.e. over each unit interval UI.

Accordingly, two samples associated with neighboring sets of samples are spaced from each other by 1/P UI in time domain, i.e. by ⅓ UI in the example shown in FIG. 3.

Moreover, samples within each set of samples are spaced from each other by 1 UI, i.e. by one symbol duration in time domain.

FIG. 3 further shows one particular choice for the length of the polyphase filters 26, or rather for the length of the moving average filters, namely a length of five unit intervals, which corresponds to five sample points that are processed in each step.

However, this is a purely exemplary choice, as the moving average filters may, of course, have another length. As already mentioned above, the moving average filters may respectively have a length of 5 to 100 samples, for example 20 to 80 samples, for instance 35 to 65 samples. For instance, the length corresponds to 49 samples.

There are several different possibilities for the definition of the difference quantities. Two possible definitions will be explained in more detail in the following.

The first possibility is illustrated in FIG. 3. The difference quantities are determined by the polyphase filters 26 by determining a squared amplitude difference between each of the input samples associated with the respective set of samples and at least one amplitude threshold.

In other words, amplitudes of each of the input samples are subtracted from the respective amplitude threshold, and the difference obtained is squared. This is done by each of the individual polyphase filters 26 for each sample.

Therein, the amplitude threshold for each sample is given by the nearest possible signal level, which is illustrated by the dashed lines between the individual sample points and the respectively nearest signal level.

For each set of samples, the determined squared amplitudes differences are summed, thereby obtaining the difference quantity for the respective set of samples.

Figure 4:
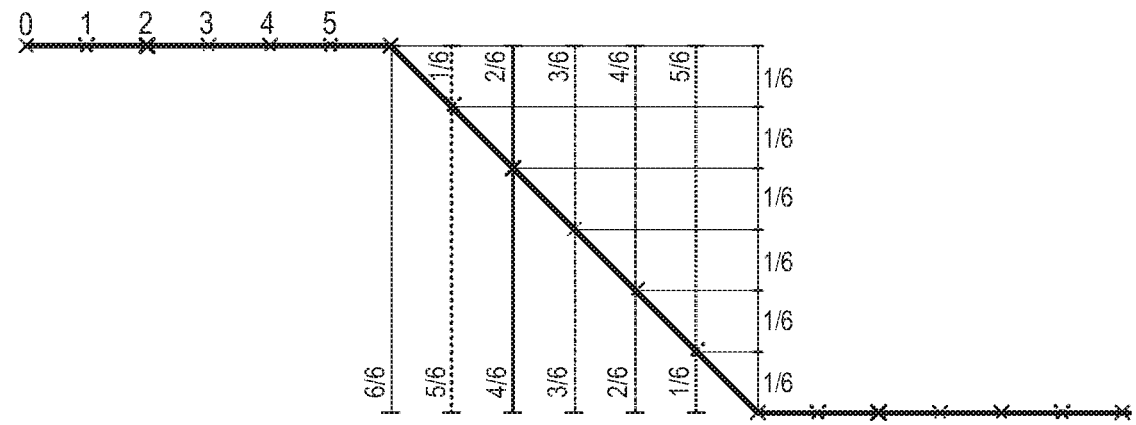
FIG. 4 shows a further diagram of an input signal plotted against time.

The second possibility is illustrated in FIG. 4. The difference quantities are determined by the polyphase filters 26 by determining a squared amplitude difference between two consecutive input samples associated with the respective set of samples. In other words, amplitudes of the two consecutive samples are subtracted from each other, and the difference is squared. This is done by each of the polyphase filters 26 for consecutive input samples.

It is noted that in FIG. 4, six polyphase filters 26 are used, such that there are six different sets of input samples (i.e. six polyphases). For sake of simplicity, in FIG. 4 the amplitude differences between consecutive samples are given in units of the signal level difference between the two shown signal levels. For each set of samples, the determined squared amplitudes differences are summed, thereby obtaining the difference quantity for the respective set of samples.

Figures 5, 6:
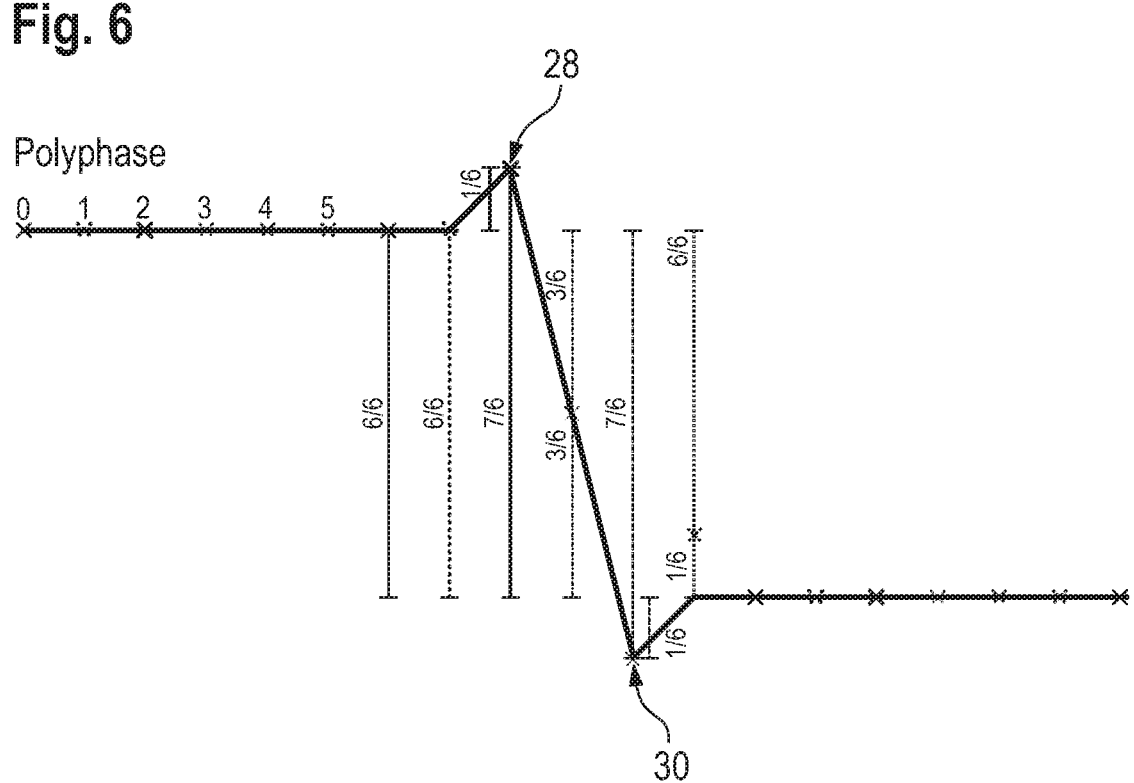
FIG. 5 shows a table of difference quantities for several polyphases.
FIG. 6 shows a further diagram of an input signal plotted against time.

The resulting difference quantities are given in FIG. 5, which shows a table of the individual sets of samples (Polyphase), the individual amplitude values of the individual samples of the different sets of samples (value), the amplitude difference between consecutive samples (diff.), and the sum of the corresponding squared amplitude differences (sum).

For both of the possibilities described above, the obtained difference quantities are forwarded to the polyphase analysis module 18. The polyphase analysis module 18 compares the difference quantities received from the polyphase filters 26 based on a predefined criterion and determines the at least one timing parameter based on the comparison (step S3).

In general, the predefined criterion may be a maximum sum of squares or a minimum sum of squares. The respective predefined criterion chosen may inter alia depend on the possibility used, namely the first one (amplitude threshold) or the second one (consecutive samples).

For the first possibility or rather choice of difference quantities described above (squared amplitude differences between samples and respective amplitude threshold), the predefined criterion is (always) a minimum sum of squares criterion. Thus, the set of samples having the smallest sum of squares is chosen by the polyphase analysis module 18 in order to determine the at least one timing parameter.

The set of samples having the minimum sum of squares is associated with a middle portion of the symbols of the symbol sequence. In other words, the individual input samples of that particular set of samples are each located in the middle of a symbol.

Thus, by comparing the different sets of samples based on that predefined criterion, i.e. the minimum sum of squares, the symbol times are determined. In other words, the at least one timing parameter comprises the symbol times.

For the second possibility or rather choice of the difference quantities described above (squared amplitude differences between consecutive samples), the predefined criterion may either be a minimum sum of squares criterion or a maximum sum of squares criterion.

The set of samples that is associated with the maximum sum of squares is associated with a middle portion of the symbols of the symbol sequence. In other words, the individual input samples of that particular set of samples are each located in the middle of a symbol.

Thus, by comparing the different sets of samples based on that predefined criterion, i.e. the maximum sum of squares, the symbol times are determined. In other words, the at least one timing parameter comprises the symbol times.

In the particular example of FIGS. 4 and 5, the set of samples with number "0" has the highest sum of squares and thus corresponds to the symbol times.

The set of samples that is associated with the minimum sum of squares is associated with a symbol transition time of the symbols of the symbol sequence. In other words, the individual input samples of that particular set of samples are located at a signal edge of the input signal.

Thus, by comparing the different sets of samples based on that predefined criterion, i.e. the minimum sum of squares, the signal edge times are determined. In other words, the at least one timing parameter comprises the signal edge times in that case.

In the particular example of FIGS. 4 and 5, the set of samples with number "3" has the lowest sum of squares and thus corresponds to the signal edge times.

It is noted that the symbol times can easily be determined based on the signal edge times by adding half of the unit interval to the signal edge times. Moreover, it is noted that the latter technique, i.e. the minimum sum of squares criterion applied to the squared amplitude differences between consecutive samples, is for example reliable for determining the signal edge times even if the input signal comprises imperfections.

One example for such imperfections is shown in FIG. 6, which shows an input signal having an overshoot portion 28 and an undershoot portion 30 in the area of the symbol transition. At least the input samples associated with the set of samples fulfilling the predefined criterion are then forwarded to the symbol recognition module 20. Of course, all samples associated with the input signal may be forwarded to the symbol recognition module 20.

The symbol recognition module 20 determines the individual symbol values based on the received input samples and based on the at least one determined timing parameter, for example based on the symbol times (step S4). For this purpose, the symbol recognition module 20 may compare the amplitude of the input signal at the symbol times with the possible signal levels, i.e. to the N possible signal levels for a PAM-N coded signal, and may assign the input signal to the nearest signal level, respectively.

Thus, after step S4, the individual symbol values and the individual symbol times are known.

In order to enhance the stability of the signal analysis method, an auxiliary or additional condition may be applied to the polyphase chosen and used in step S4 (i.e. the used set of samples). More specifically, the set of samples (polyphase) used in step S4 may be required to be at most one polyphase away from a preceding filtering iteration via the polyphase filters 26.

In some embodiments, it has turned out that the optimal polyphase of the several possible ones is typically jumping back and forth between two successive polyphase filters 26. Any deviations from this scheme observed is based on undesirable disturbances which can be suppressed effectively by using the above-mentioned auxiliary or additional condition according to which different polyphase filters 26 applied in successive iterations have to be neighbored polyphase filters 26.

Furthermore, the auxiliary or additional condition may additionally or alternatively comprise that an additional sample point for the first polyphase, also called polyphase 0, is used in case that the optimal polyphase would jump from the first polyphase, namely polyphase 0, to the N−1 polyphase, for instance polyphase 5 in case of N=6 polyphase filters 26. This effectively avoids that the distance between two successive sampling points equals almost 2 UI which might cause missing a symbol.

Based on the individual symbol values and symbol times, the threshold detection module determines suitable decision thresholds for signal level transitions between actual signal levels of the input signal (step S5).

For an undisturbed input signal, these decision thresholds are simply located half way between two neighboring ideal signal levels of the input signal.

However, due to disturbances in the input signal, the actual signal levels may be shifted with respect to the ideal signal levels. These disturbances are addressed by adjusting the decision thresholds to values that are suitable for the actual signal levels.

If necessary, the input signal may be resampled by the interpolation module 24, e.g. by interpolating between consecutive samples (step S6). For example, resampling may be necessary if there is no sample associated with times at which the input signal crosses the determined decision thresholds.

The resampled input signal may then be forwarded to a clock recovery module 32, which performs a clock recovery of a clock underlying the input signal based on the resampled input signal, based on the individual symbol values, and/or based on the decision thresholds (step S7).

In some embodiments, the clock recovery circuit or module 32 may perform clock recovery under consideration of jitter comprised in the input signal (also called "jitter CDR").

The signal analysis method described above is applicable if the input signal is not based on a spread spectrum clocking (SSC) technique. If, however, the input signal is based on a SSC technique, small adaptations to the signal analysis method described above are necessary.

Due to the SSC, the temporal length of an eye in the eye diagram varies between a unit interval $UI_0$ and a shifted unit interval $UI_0+\Delta$, wherein the shift $\Delta$ is introduced by the SSC.

In order to compensate that shift $\Delta$, the distance between the individual samples within each set of samples has to be increased by half of the shift, i.e. by $\Delta/2$. Accordingly, the distance between samples within each set of samples then is equal to $UI+\Delta/2$.

Summarizing, the signal analysis methods described above are based on the idea to apply the polyphase filters 26 directly to the input samples, i.e. before symbol transitions in the input signal are detected and before a clock recovery is performed. Instead, the at least one timing parameter is determined directly based on the input samples by the polyphase filters 26. Therein, the input samples are processed in parallel by the polyphase filters 26, such that the different sets of samples are processed simultaneously.

This way, no feedback loop is required in order to determine the at least one timing parameter, as the input signal or rather the input samples associated with the input signal are processed in parallel by the polyphase filters 26. Thus, the signal analysis methods described above enables real-time processing of the input signal with small latency even at high data rates for N-ary input signals.

Certain embodiments disclosed herein utilize circuitry (e.g., one or more circuits) in order to implement standards, protocols, methodologies or technologies disclosed herein, operably couple two or more components, generate information, process information, analyze information, generate signals, encode/decode signals, convert signals, transmit and/or receive signals, control other devices, etc. Circuitry of any type can be used.

In an embodiment, circuitry includes, among other things, one or more computing devices such as a processor (e.g., a microprocessor), a central processing unit (CPU), a digital signal processor (DSP), an application-specific integrated circuit (ASIC), a field-programmable gate array (FPGA), a system on a chip (SoC), or the like, or any combinations thereof, and can include discrete digital or analog circuit elements or electronics, or combinations thereof. In an embodiment, circuitry includes hardware circuit implementations (e.g., implementations in analog circuitry, implementations in digital circuitry, and the like, and combinations thereof).

In an embodiment, circuitry includes combinations of circuits and computer program products having software or firmware instructions stored on one or more computer readable memories that work together to cause a device to perform one or more protocols, methodologies or technologies described herein. In an embodiment, circuitry includes circuits, such as, for example, microprocessors or portions of microprocessor, that require software, firmware, and the like for operation. In an embodiment, circuitry includes one or more processors or portions thereof and accompanying software, firmware, hardware, and the like.

The present application may reference quantities and numbers. Unless specifically stated, such quantities and numbers are not to be considered restrictive, but exemplary of the possible quantities or numbers associated with the present application. Also in this regard, the present application may use the term "plurality" to reference a quantity or number. In this regard, the term "plurality" is meant to be any number that is more than one, for example, two, three, four, five, etc. The terms "about," "approximately," "near," etc., mean plus or minus 5% of the stated value. For the purposes of the present disclosure, the phrase "at least one of A and B" is equivalent to "A and/or B" or vice versa, namely "A" alone, "B" alone or "A and B.". Similarly, the phrase "at least one of A, B, and C," for example, means (A), (B), (C), (A and B), (A and C), (B and C), or (A, B, and C), including all further possible permutations when greater than three elements are listed.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The embodiments of the invention in which an exclusive property or privilege is claimed are defined as follows:

1. A signal analysis method, said signal analysis method comprising:
    at least one of generating input samples associated with an input signal and receiving input samples associated with an input signal, said input signal comprising a symbol sequence;
    determining a first difference quantity based on a first set of samples by a first polyphase filter, said first set of samples comprising at least two of said input samples;
    determining a second difference quantity based on a second set of samples by a second polyphase filter, said second set of samples comprising at least two of said input samples, wherein said input samples associated with the second set of samples are time-shifted with respect to said input samples associated with the first set of samples;
    comparing said first difference quantity and said second difference quantity based on a predefined criterion; and
    determining at least one timing parameter of said symbol sequence based on the comparison of said first difference quantity and said second difference quantity.

2. The signal analysis method of claim 1, wherein at least a third polyphase filter is provided, wherein a third difference quantity is determined based on a third set of samples by said third polyphase filter, wherein said third set of samples comprises at least two of said input samples, and wherein said input samples associated with said third set of samples are time-shifted with respect to each of said input samples associated with said first set of samples and with respect to said input samples associated with said second set of samples.

3. The signal analysis method of claim 1, wherein said difference quantities respectively comprise at least one squared amplitude difference between two consecutive input samples associated with the respective set of samples.

4. The signal analysis method of claim 3, wherein said predefined criterion comprises a maximum sum of squares or a minimum sum of squares.

5. The signal analysis method of claim 1, wherein said difference quantities respectively comprise at least one squared amplitude difference between at least one of said input samples associated with the respective set of samples and at least one amplitude threshold.

6. The signal analysis method of claim 5, wherein said predefined criterion comprises a minimum sum of squares.

7. The signal analysis method of claim 1, wherein at least one of said input samples associated with the first set of samples are spaced from each other by one symbol period in time domain, and said input samples associated with said second set of samples are spaced from each other by one symbol period in time domain.

8. The signal analysis method of claim 1, wherein said sets of samples are time-shifted with respect to one another such that the input samples associated with said sets of samples are evenly distributed over at least one symbol period.

9. The signal analysis method of claim 1, wherein at least one of said first polyphase filter and said second polyphase filter comprises a moving average filter.

10. The signal analysis method of claim 1, wherein said first polyphase filter and said second polyphase filter are implemented in parallel.

11. The signal analysis method of claim 1, wherein said first polyphase filter and said second polyphase filter are implemented in hardware.

12. The signal analysis method of claim 1, wherein said at least one timing parameter comprises at least one of clock signal times, signal edge times, and symbol times.

13. The signal analysis method of claim 1, wherein said input signal is PAM-N coded.

14. A signal processing module, comprising an input, a first polyphase filter, a second polyphase filter, and a signal analysis circuit,
    said input being configured to at least one of generate input samples associated with an input signal and receive input samples associated with an input signal, said input signal comprising a symbol sequence,
    said first polyphase filter being configured to determine a first difference quantity based on a first set of samples, said first set of samples comprising at least two of said input samples,
    said second polyphase filter being configured to determine a second difference quantity based on a second set of samples, said second set of samples comprising at least two of said input samples, wherein said input samples associated with the second set of samples are time-shifted with respect to said input samples associated with the first set of samples,
    said signal analysis circuit being configured to:
        compare said first difference quantity and said second difference quantity based on a predefined criterion, and
        determine at least one timing parameter of said symbol sequence based on the comparison of said first difference quantity and said second difference quantity.

15. The signal processing module of claim 14, further comprising at least a third polyphase filter, wherein said third polyphase filter is configured to determine a third difference quantity based on a third set of samples, wherein said third set of samples comprises at least two of said input samples, and wherein said input samples associated with said third set of samples are time-shifted with respect to each of said input samples associated with said first set of samples and with respect to said input samples associated with said second set of samples.

16. The signal processing module of claim 14, wherein at least one of said first polyphase filter and said second polyphase filter comprises a moving average filter.

17. The signal processing module of claim 14, wherein said first polyphase filter and said second polyphase filter are implemented in parallel.

18. The signal processing module of claim 14, wherein said first polyphase filter and said second polyphase filter are implemented in hardware.

19. The signal processing module of claim 14, wherein said difference quantities respectively comprise at least one squared amplitude difference between two consecutive input samples associated with the respective set of samples.

20. The signal processing module of claim 19, wherein said predefined criterion comprises a maximum sum of squares or a minimum sum of squares.

* * * * *